United States Patent [19]
Dolidon et al.

[11] Patent Number: 5,408,623
[45] Date of Patent: Apr. 18, 1995

[54] PROCESSOR WITH MULTIPLE MICROPROGRAMMED PROCESSING UNITS

[75] Inventors: Thierry Dolidon, Garancieres; Hubert Franzetti, Plaisir; Marie-Odile Lamarche, L'Hay Les Roses; Philippe Vallet, Lardy; Annie Vinot, Orgeval, all of France

[73] Assignee: Bull, S.A., Paris, France

[21] Appl. No.: 127,124

[22] Filed: Sep. 27, 1993

Related U.S. Application Data

[63] Continuation of Ser. No. 620,130, Nov. 30, 1990, abandoned.

[30] Foreign Application Priority Data

Nov. 30, 1989 [FR] France .................. 89 15776

[51] Int. Cl.⁶ .................. G06F 9/00; G06F 15/16
[52] U.S. Cl. .................. 395/375; 395/800; 364/928.3; 364/930.2; 364/230.6; 364/281.7
[58] Field of Search .................. 395/325, 375, 800

[56] References Cited

U.S. PATENT DOCUMENTS 4,636,942  1/1987  Chen et al. .................. 395/725
5,016,163  5/1991  Jesshope et al. .................. 395/800

FOREIGN PATENT DOCUMENTS 0260409  3/1988  European Pat. Off. .

OTHER PUBLICATIONS

IEEE Transactions on Computers, vol. C-27, No. 3, Mar. 1978 pp. 270-275; L. C. Higbie.

Primary Examiner—Robert B. Harrell
Assistant Examiner—Ayni Mohamed
Attorney, Agent, or Firm—Kerkam, Stowell, Kondracki & Clarke; Edward J. Kondracki

[57] ABSTRACT

A data processing system having processors with large instruction sets comprises a plurality of microprogrammed execution units (EAD, BDP, FPP), which communicate with one another and with a memory (MU) by way of a cache memory (CA). One of the units is an addressing unit (EAD). A second unit is a binary and a decimal calculation unit (BOP). A third unit is a floating point calculation unit (FPP). To permit the units to function autonomously, each unit includes its own command block and synchronizing means to authorize or interrupt the execution of the microprogram defined by the instruction in progress in each unit. These synchronizing means interrupt said execution if: either an operand contained in said memory means (CA) and necessary for said execution is not effectively received by said unit, or a result expected by said unit and calculated by another unit is not effectively received by said unit, or a result calculated in said unit cannot be effectively transmitted to the unit or to the memory means intended to receive said result.

40 Claims, 6 Drawing Sheets

PROCESSOR WITH MULTIPLE MICROPROGRAMMED PROCESSING UNITS

This is a Continuation of application Ser. No. 07/620,130, now abandoned, filed Nov. 30, 1990.

CROSS-REFERENCE TO RELATED APPLICATIONS

The invention disclosed and claimed herein is related to the subject matter of the following commonly-assigned U.S. patent application, the entire disclosure of which is hereby expressly incorporated herein by reference:

Ser. No. 07/620,742, now U.S. Pat. No. 5,035,425 filed Nov. 30, 1990, concurrently herewith, by Christian BERNARD et al, entitled PROCESSOR WITH A PLURALITY OF MICROPROGRAMMED UNITS WITH MECHANISM FOR ANTICIPATED EXECUTION OF INSTRUCTIONS corresponding to French application No. 89.16952.

BACKGROUND OF THE INVENTION

The invention pertains to the field of information processing systems and relates to a particular embodiments of processors that can be used in these systems.

Typically, an information processing system comprises a central subsystem that can communicate with one or more peripheral subsystems. The central subsystem is composed of one or more processors connected, for example by a bus, to a central memory and to one or more input/output units. The input/output units enable communication between the central subsystem and the peripheral subsystem.

The function of each processor is to execute program instructions contained in the central memory. To do this, a processor includes means for addressing the memory, in order to access the instructions and data necessary for processing information. To shorten the mean access time to these instructions and data, the processors are typically provided with a cache memory that serves as a buffer between the central memory and the processing circuits of the processor.

For small systems, in modern very large scale integrated technology or VLSI, the processing circuits of the processor can all be integrated into a single integrated circuit, or chip. For less powerful processors, contrarily, despite the steadily increasing scale of integration, the circuits of the same processor must be distributed among a plurality of integrated circuits. To this end, the processor is subdivided into a plurality of functional units, each of which corresponds to one or more integrated circuits. Thus each integrated circuit of the processor can comprise a specialized processing unit, which contributes to executing the set of machine instructions that the processor can execute. Naturally, each processing unit must be capable of communication with the central memory by way of the cache memory. Moreover, depending on the functional format selected, specific links must be provided that enable communication among these units.

Among the set of processing circuits included in the various units of the processor, distinctions are typically made between a command portion, often called a "command block", and a processing portion, generally called the "data path". The command block drives the addressing circuits and the data path as a function of the instructions received. The addressing circuits command the cache memory to drive both the transfer of the instructions and operands to the processing circuits and the transfer of the results processed by these circuits to the cache memory.

In the case of processors having a large instruction set, the microprogramming technique is generally used for the command block. The command block then essentially comprises a hard-wired microsequencer associated with a microprogram memory. As a function of the operating code of the instruction to be executed and of the logic state of the processor, the microsequencer executes an addressing of the microprogram memory, generally upon each cycle. At its output, the memory furnishes microprogram words that trigger the sending of command signals to the various circuits. Naturally, the command block may also include entirely hard-wired circuits, especially for executing certain functions for which faster optimization is desired.

A typical solution for making the microprogrammed command blocks of a processor is to provide a unit specialized for this function. The command block is then contained entirely within this unit, which may be in the form of an integrated circuit, generally associated with one or more external microprogram memories. European Patent Application Serial No. 85 113207.6, published as No. EP-A-17861 on Apr. 23, 1986, and entitled "Distributed Control Store Architecture", may be mentioned as an example of such a command block.

In this version, each processing unit is commanded in centralized fashion in the command block. As a result, each unit contributes at every moment to the execution of the same microinstruction. It has been seen that the various processing units of the processor are equivalent to sharing the set of processor functions.

For example, a first unit will be assigned the addressing function; another unit will be assigned the logical and digital and decimal arithmetic processing functions; a third unit will be assigned the floating point operations. With this type of functional format, the execution of an instruction, that is, of an associated microprogram, generally does not require the simultaneous effective functioning of these three units. For example, if the instruction comprises adding an operand contained in memory to the contents of a register of the processor and arranging the result in this register, its execution includes the following steps:

1) calculation of the real address of the operand from the logical address defined by the instruction;

2) addressing of the memory, loading the operand into the calculation unit, and execution of the operation;

3) writing the result in the register.

In this example, it can be seen that only the addressing unit is used during step 1, and only the calculation unit is used during steps 2 and 3. Thus when one unit is working the others are inactive, which does not represent optimal utilization of the equipment.

SUMMARY OF THE INVENTION

The object of the invention is accordingly to overcome these disadvantages, by proposing a processor with multiple microprogrammed processing units capable of functioning with maximum autonomy, to enable optimizing the use of these units and in particular to allow pipeline functioning, in which a plurality of units simultaneously execute microprograms for executing different instructions.

However, for the best optimization of function, certain difficulties that the absence of centralization of the command block entails must be solved.

In particular, each unit must of course detect the beginning and end of each instruction, but it must also determine at each moment whether it can execute its specific microprogram, defined by the instruction in progress, because in the pipeline mode, different instructions may have to be executed simultaneously in a plurality of units.

Hence a mechanism for synchronizing the microprograms of different units must be provided, so that they will be executed in a predetermined order and the precise functions corresponding to those instructions will be performed properly.

To this end, the subject of the invention is a processor for a data processing system including a plurality of microprogrammed processing units sharing the set of functions of the processor, each unit being assigned the execution of a subset of functions of the processor, the units being connected to memory means containing the instructions of the programs to be executed and the operands, at least one of the units being an addressing unit for addressing the memory means to obtain the instructions and the operands, the processor being characterized in that the units include their own command block for decoding the instructions furnished by the memory means and autonomously executing the functions defined by the instructions; that each microprogrammed unit includes synchronizing means for authorizing or interrupting the execution of the microprogram defined by the instruction in progress in the unit; and that the synchronizing means interrupt the execution if:

either an operand contained in the memory means and necessary for the execution is not effectively received by the unit, or a result expected by the unit and calculated by another unit is not effectively received by the unit, or a result calculated in the unit cannot be effectively transmitted to the unit or to the memory means intended to receive the result.

Regardless of the functional format and the number of units, the synchronizing means as defined above provide very great flexibility in processor functioning. As already indicated, the execution of an instruction can be subdivided into a plurality of successive steps, where the processing of each step is confined to a predetermined unit, as a function of the functional format selected. Depending on the type of instruction, a step that is to be executed in a unit may necessitate obtaining an operand contained in memory, or obtaining a result calculated in another unit in a preceding step of the same instruction. The proposed synchronization is based on a mechanism for overseeing exchanges of operands and results, which assures that for each unit and each step, the operations assigned to that unit and relating to a given instruction will not be executed unless the preceding steps of the same instruction have indeed been executed; this is so, if an operand or result expected is indeed received by the unit. In each unit, this mechanism also assures that all the operations that must be performed in that unit and that relate to the preceding instruction have indeed been performed before the authorization of execution of the instruction in progress, and this is so, if a result that would have to be transmitted by the unit in the course of the preceding instruction has indeed been sent and received by its addressee.

Various solutions for implementing this synchronization are conceivable. However, it is clear that the subdivision of the instructions into steps must take into account the functional format and the synchronizing mechanism per se. To this end, the microprograms provided for each unit must be processed in accordance with certain microprogramming rules that derive from these constraints.

The application of these rules is within the competence of those skilled in the art of microprogramming and hence will not be described in detail here.

As intended, the invention will be realized by attempting to make optimal use of the resources shared among the units and the memories. Essentially, these resources comprise links for the exchange of data. It is equally suitable for these links to authorize all the simultaneous operations that can be foreseen during functioning, in particular in the pipeline mode, where a result and an operand may be transmitted at the same instant.

To this end, and in a preferred embodiment of the invention, the processor is further characterized in that the memory means includes interface means connected to a first bus, called the operand bus, and a second bus, called the result bus, the first and second buses serving respectively to read the operands and write the results into the memory means; that each unit is connected to the operand bus and result bus via a first and second interface, respectively; that each unit includes means for receiving and detecting a first indicator of ownership or capture associated with the operand bus and means for sending to the other units the first indicator of ownership; that each unit includes means for receiving and detecting a second indicator of ownership associated with the result bus and means for sending to the other unit the second indicator of ownership; that the units are connected to one another via first and second control links respectively enabling the sending of the first and second indicators; that one of the conditions of effective reception of an operand by a unit is the detection of the first indicator by the unit; and that one of the conditions of effective sending of a result by a unit is the detection of the second indicator in the unit.

In this embodiment, the operand and result buses are separate, but each is shared among the units. Because of the associated ownership indicators, only one unit at a time is the owner or captor of the bus in question. On the other hand, the operand bus is managed by a mechanism of reception ownership, while the result bus is managed by a mechanism of sending ownership. These arrangements prevent any risk of conflicts among the units and simplify detection for each unit of the synchronization conditions based on the effective reception of an operand and the effective sending of a result.

In general, the cache memory that furnishes the operands has an asynchronous function, which requires the processing of acknowledgement signals, to give notice to the outside that a previously addressed datum is available at the memory output. This sending notification signal will also serve as a synchronization condition.

In an embodiment of the invention, the processor is further characterized in that the memory means are connected to the units via operand sending notification links associated with the operand bus and include means for transmitting operand sending signals over these links when the memory means send an operand, and that each unit includes means for receiving and detecting the operand sending signals, and that another condition of effective reception of an operand by a unit is the detection by the unit of an expected sending signal.

Analogously, the effective sending condition of a result may be determined in unit as a function of availability signals sent by the other units or by the cache memory.

On the other hand, to determine the condition of effective reception of a result, a send notification signal and an addressee signal may be provided, both of these signals being sent by the unit that sends the result.

In this embodiment, the processor is characterized in that the units are connected to one another by links notifying that a result has been sent, which are associated with the result bus, the units including means for exchanging result sending signals and addressee signals over these links; that the result sending signals and the addressee signals are sent by the owner unit of the result bus when the owner unit sends data over the result bus to the unit identified by the addressee signals; and that the condition of effective reception of a result by a unit is the detection of a result sending signal and the coincidence of the addressee signals with the identity of the unit.

BRIEF DESCRIPTION OF THE DRAWINGS

Further characteristics and details of the embodiment of the invention will be described in the ensuing description, taken in conjunction with the drawings.

DESCRIPTION OF THE PREFERRED EMBODIMENT

Figure 1:
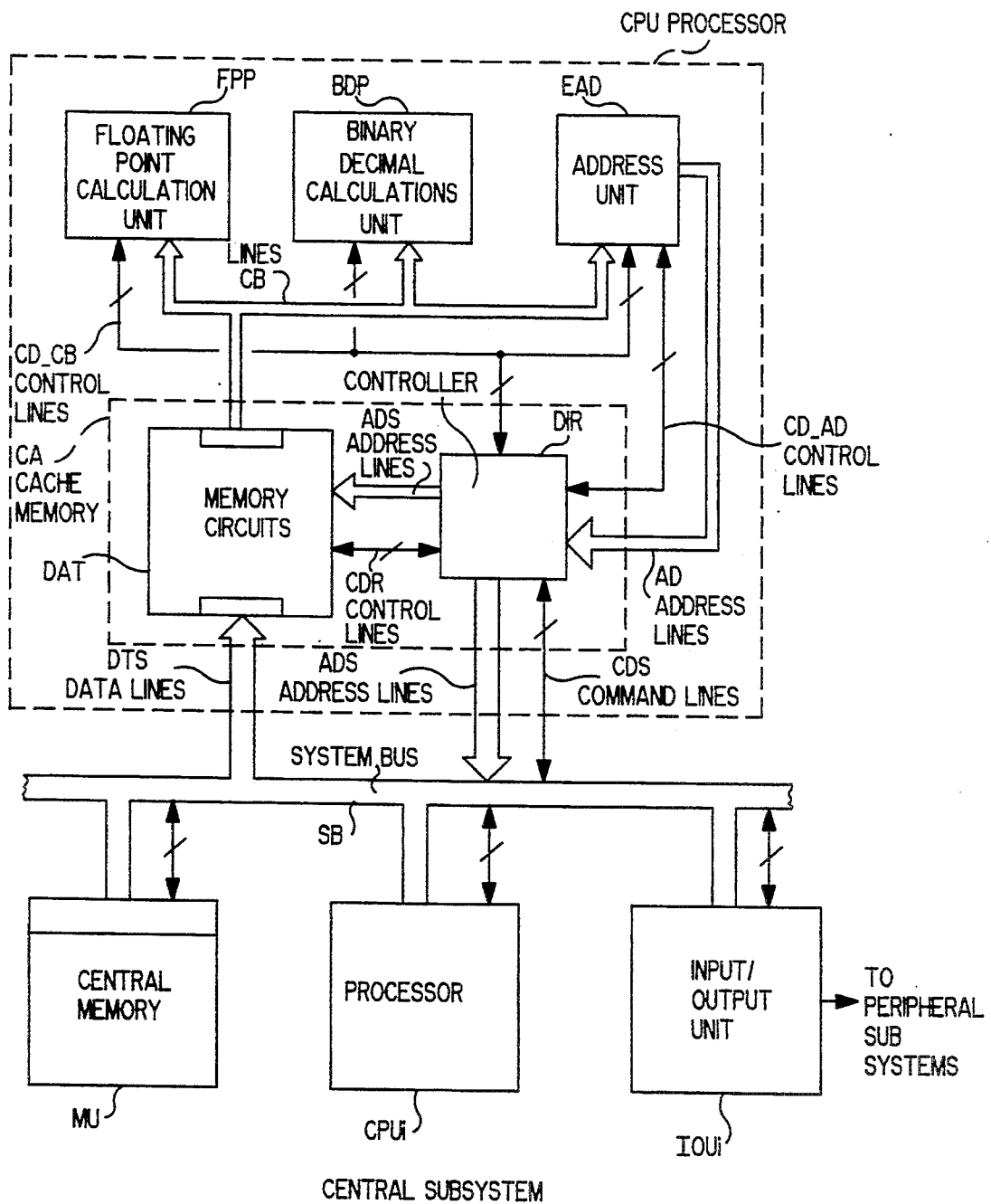
FIG. 1 shows an information processing system including the processor according to the invention.

The system of FIG. 1 comprises a plurality of processors CPU, CPUi connected to a system bus SB in such a way as to be capable of communication with one another and with a central memory MU and with the input/output unit IOUi. The number of processors CPUi and input/output units IOUi may be variable, as may be the number of memory modules comprising the central memory MU. All these elements form what is called the central subsystem of an information processing system capable of communicating with one or more peripheral subsystems (not shown) by way of the input/output units IOUi.

FIG. 1 shows within a block CPU outlined by dash lines the main components of one of the processors in more detailed fashion. This processor is connected to the system bus SB by way of a cache memory CA outlined in dash lines and serving as a buffer between the central or main memory MU and the execution units EAD, BDP, FPP of the processor. The cache memory CA substantially comprises memory circuits DAT of lesser capacity than the central memory MU, and a controller DIR for managing the interfaces with the system bus SB, on the one hand, and the execution units EAD, BDP and FPP, on the other. These units and the controller may be embodied as VLSI chips. The memory circuits DAT exchange the data with the system bus SB by way of data lines DTS. The controller DIR communicates with the bus SB via address lines ADS and command lines CDS.

As a non-limiting example of an embodiment, one of the execution units EAD is assigned specifically to the addressing operations, particularly for obtaining instructions and operands from the cache memory CA. The unit EAD is then connected to the controller DIR by address lines AD that carry the calculated real address signals. The unit EAD and the controller DIR are also operatively connected to one another by address control signals via associated control lines CD-AD. These address and control signals are taken into account by the controller DIR to command the memory circuits DAT in turn, by way of address lines ADR and internal control lines CDR. In response to this information, the memory circuits DAT can exchange the instructions, operands and results with the execution units EAD, BDP, FPP by way of lines CB.

Since the processor according to the invention has execution units capable of autonomously executing their own microprogram, these units are connected to one another and to the controller DIR by way of control lines CD-CB in such a way as to enable synchronization and coherence of the operations executed in these units.

In the example shown, the execution is confined to three units, which share the following functions:

translation of virtual addresses into real addresses, and addressing of the cache memory, for EAD;

binary and decimal calculations, for BDP;

floating point calculations (scientific calculations), for FPP.

It should be noted that the invention is not limited to this particular functional format. Also, for the sake of simplicity, FIG. 1 shows neither the clock circuits nor the associated maintenance devices.

Aside from the particular role of the information and signals that the units exchange with one another and with the cache memory, the system of FIG. 1 performs like a conventional system. Hence there is no need to describe the known aspects of its function, and the ensuing description will be devoted to the aspects directly connected with the invention.

The embodiment that will now be described takes the form first of the particular interfaces of the cache memory and the corresponding interfaces of the units, along with the associated links. These elements will be described in conjunction with FIGS. 2 and 3.

Figure 2:
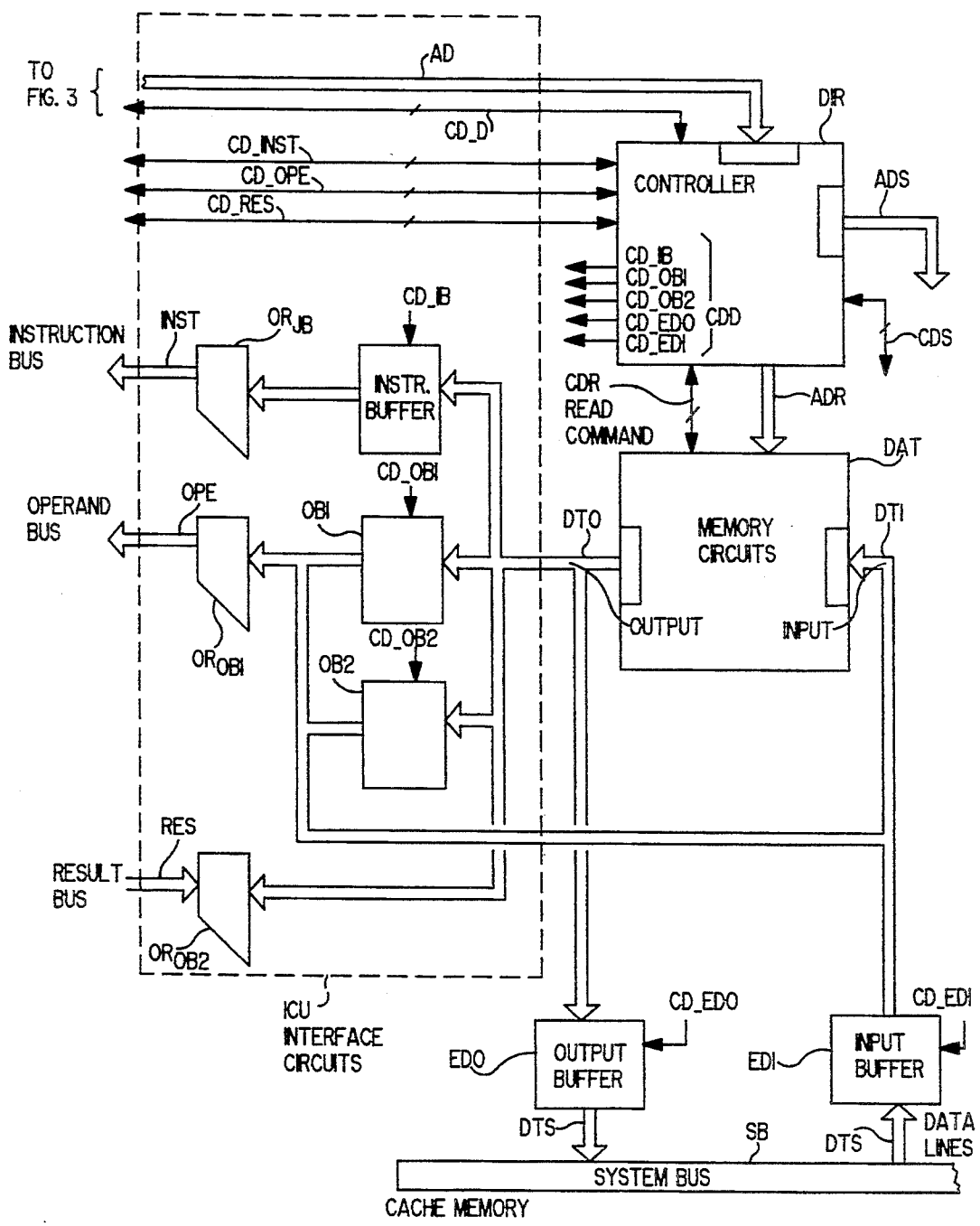
FIG. 2 shows a cache memory and its circuits that interface with the processing units of the processor, in a preferred embodiment of the invention.

FIG. 2 shows the cache memory CA, which includes the controller DIR, connected to EAD by the lines AD and CD-AD, and the memory circuits DAT. The cache memory CA communicates with the three execution units by way of a set of interface circuits ICU, shown within the dash lines and three buses INST, OPE, RES and the associated control lines CD-INST, CD-OPE, CD-RES, respectively, to which the three execution units, are connected.

The bus INST is assigned to transferring instructions between the memory DAT and the units. The output DTO of the memory DAT is connected to the bus INST by way of an instruction buffer IB and an off-register circuit.

The buses RES and OPE are assigned to transferring the results and operands, respectively. These buses are connected to the output DTO and the input DTI of the memory DAT by way of buffers OB and OB2 and off-register circuits. The buffers IB, OB1, OB2 can be loaded from the memory DAT in response to the reading commands CDR of the controller DIR. Finally, the input DTI and the output DTO of the memory DAT are connected to the data lines DTS of the system bus SB, via an input buffer EDI and an output buffer EDO, respectively.

The buffers IB, OB1, OB2, EDO, EDI are commanded respectively by the signals CD-IB, CD-OB1, CD-OB2, CD-EDO and CD-EDI furnished by the controller DIR. These signals serve to select reading or writing of the various registers of these buffers upon data transfer to or from the memory DAT and to or from the execution units.

The functioning of the cache memory for the internal operations relating to the system bus SB is to a great extent conventional. However, it may be useful to recall that the address information and the associated commands furnished by the addressing unit EAD are taken into account by the controller DIR in order to search in an internal associative memory (called a directory) whether the data corresponding to the address received are indeed present in the memory DAT. If so, the controller DIR directly addresses the memory DAT and commands the operations of reading or writing. If not (in the case of a "miss"), the controller triggers a reading operation in the central memory MU by means of address and command signals transmitted by the lines ADS and CDS, respectively. Once the updating of the memory DAT has been completed, the exchanges of data with the processing units resume in normal fashion.

It should be noted that these updating operations are invisible to the processing units. They simply translate into the presence of a busy signal BUSY sent by the controller DIR to the processing units.

Particular embodiment aspects of the invention relate to the exchanges between the cache memory and the processing units. An explanation on this subject will be given in conjunction with FIG. 4, but first the organization of the execution units should be described.

Figure 3:
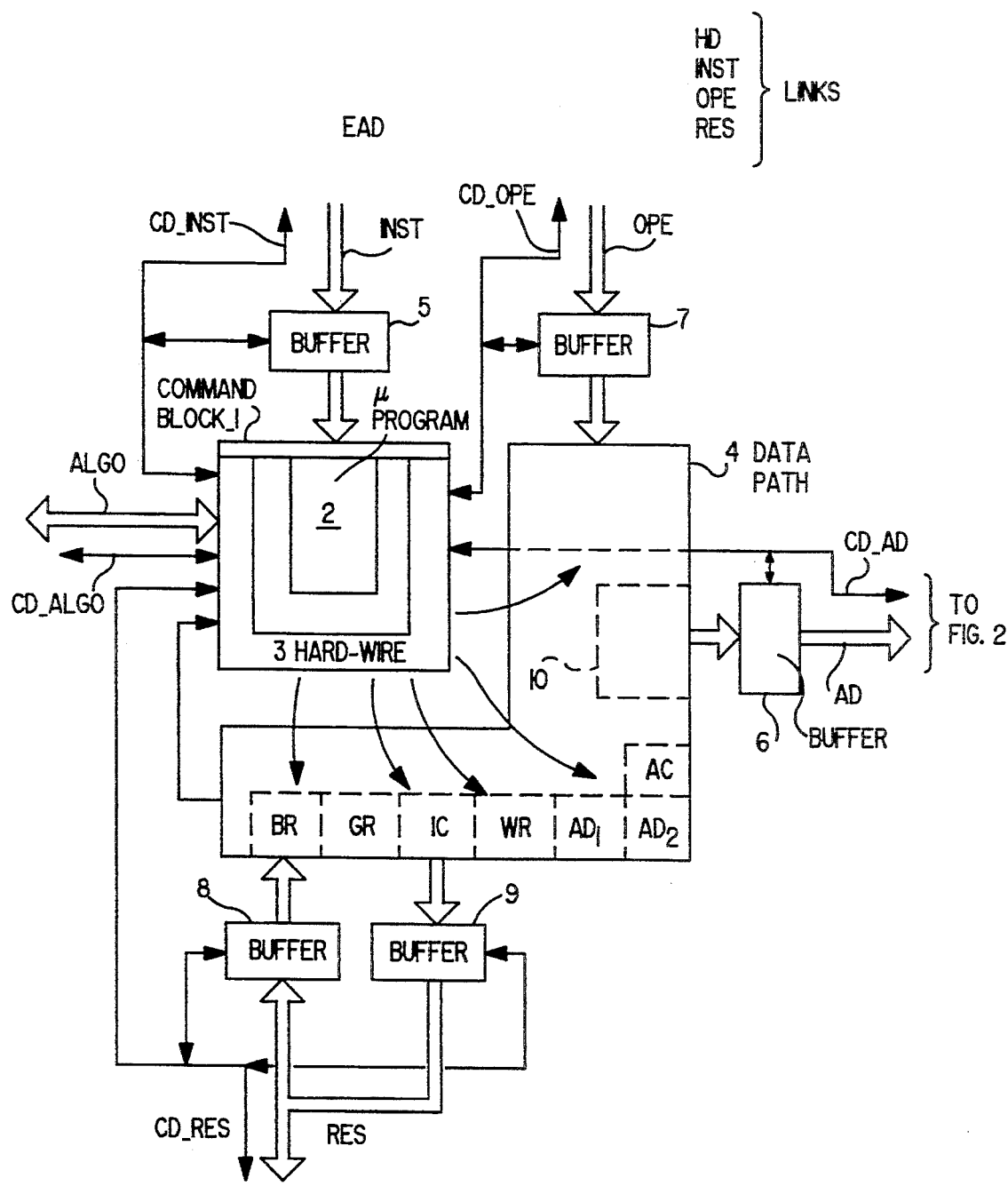
FIG. 3 schematically shows a processing unit of the processor of the invention.

FIG. 3 schematically shows the primary subassemblies comprising the addressing units EAD. The links AD, INST, OPE, RES mentioned above are found here. These links are connected to the unit by way of buffers 6, 5, 7, 8 and 9, respectively, which serve to temporarily store the addresses, instructions, operands, results received, and results to be sent which the unit exchanges with the cache memory or the other units.

Like any microprogrammed unit, it may be subdivided into two major portions: a control portion or command block 1, and an operative portion or data path 4.

The command block 1 includes an execution portion for microprograms 2 associated with a hard-wired portion 3, which cooperate with one another to manage the execution of the instructions received, and generally to perform "system" operations specifically confined to the microsoftware or firmware or microprogramming and to the hardware.

The data path 4 typically comprises hard-wired operators and registers, which can be either visible or invisible to the software and are necessary for executing instructions. These resources are controlled by means of signals issued by the command block 1.

The command block 1 is also connected to a supplementary bus known as an algorithm channel ALGO, to which the other units are connected. This bus, which is associated with command lines: CD-ALGO, will be the subject of later explanation hereinafter given.

The other execution units BDP, FPP have an organization similar to the addressing unit shown in FIG. 3. The units BDP and FPP are clearly distinguished from the addressing unit EAD by the absence of a buffer addressing interface 6 connected to the lines AD and CD-AD. On the other hand, only the unit EAD has specific circuits 10 outlined in dash lines in data path block 4 of FIG. 3. for calculation of real addresses in its operative portion. Taking their different functions into account, the three units contain different microprograms, and each has means for decoding corresponding specific microfunctions.

In the example described, the set of functions of the processor is shared among the three units EAD, BDP, FPP in the following manner:

EAD is assigned to address development, making it possible to calculate the virtual addresses as a function of the address field of the instructions received. It translates these virtual addresses into real addresses and transmits the commands and real addresses to the cache memory. The operations trigger the simultaneous loading of the instructions by the bus INST into the three units, or the sending of operands over the bus OPE to the units that need them. EAD also participates by its addressing function, in the operations of writing into memory the results processed by the other units and transmitted over the bus RES. Another important function is the management of the instructions to be loaded. To execute these functions, the data path 4 includes base registers BR, general registers GR, instruction counters IC, and a certain number of working registers WR. A first adder is also provided, to calculate the virtual address from the contents of the base registers, the contents of one of the general registers, and a displacement value furnished by the instruction being executed at that time. A second adder is assigned particularly to updating the instruction counters. Finally, the data path is provided with a circuit to accelerate translation of the virtual addresses into real addresses.

The unit BDP is a binary and decimal calculation unit that also includes not only general registers and working registers, but also certain specialized operators such as a binary adder, multiplier, Boolean operator, shifter, and decimal adder. These resources can serve not only to perform decimal binary operations defined by the instructions to be executed but also to subprocess certain auxiliary calculations on the demand of the addressing unit EAD, such as index calculations, in order to perform addressing, or calculations of the transfer of control conditions, in the case of instructions for conditional transfer of control.

The unit FPP is a scientific calculation unit enabling the operations of addition, subtraction, multiplication, and division bearing on the operands formatted with a floating point. Its data path includes large-capacity scientific and working registers and high-performance operators assigned to perform the above calculations. Naturally, the unit FPP also includes means for converting the binary representation of numbers into floating point representation, and vice versa. Hence the unit FPP is capable of executing scientific instructions, and it may also be assigned to subprocess certain operations, such as complex multiplication or division, upon demand of the unit BDP.

Since each unit is microprogrammed in such a way that it can autonomously execute specific microprograms corresponding to the instructions to be executed, each command block includes its own microprogram memory, its own microsequencer, and a set of associated logic circuits. All these elements will be described in further detail in conjunction with FIG. 5.

This microprogramming shared by a plurality of units requires means for synchronizing the microprograms that are executed simultaneously in the three units. This synchronization is implemented by means of the control lines CD-INST, CD-OPE, CD-RES and CD-ALGO. These links will now be defined and their functions described in detail, in conjunction with FIG. 4.

Looking to the right-hand portion of the figure, the interfaces of the controller DIR associated with the lines CD-AD, CD-INST, CD-OPE and CD-RES are seen. The left-hand portion of the drawing shows the corresponding interfaces of one of the execution units U1, to which the control interface CD-ALGO associated with an algorithm channel ALGO is added. In order not to make the drawing more complicated, only one unit U1 is shown, but it is understood that this unit may be either EAD, BDP or FPP. By convention, the other units will be called U2 and U3. However, given the particular role of the unit EAD, certain parts of its interface will be specific to that unit (U1=EAD), while others will be specific to the other units (U1=BDP/FPP).

The operations of addressing the memory DAT that are commanded by EAD use the lines CD-AD, which include the command lines CMD enabling EAD to send corresponding command signals. The command signals CMD serve to initialize certain operations, or memory access, that can be executed by the cache memory. The set of commands for these operations may be encoded over a plurality of bits carried by a plurality of CMD lines. As commands to be provided, the following can be named: the instruction reading command CIIR or operand reading command IOR, the operand writing command IOW, and commands for suspending operations and resuming previously suspended operations. These command lines are associated with length indicator lines LG for indicating to the cache memory, as a complement of the address, the number of bytes involved in a reading or writing command. Other lines serve to carry complementary signals such as an address validation signal, a termination signal or a signal for validating commands (not shown), along with the busy signals BUSY sent by DIR to indicate to EAD whether the cache memory is ready or not to execute commands, for example in the case of reloading from the central memory after a "miss".

Among the signals CD-INST associated with the instruction bus INST, some of them concern only the addressing units EAD: INST-SEND sent by DIR, to signal to EAD that the cache memory is sending an instruction; INST-GOT send by EAD to signal to the cache memory that an instruction previously sent has been effectively received; IIR to signal to the other units BDP, FPP that an instruction reading command CIIR has been sent to the cache memory. A transfer of control validation line BRVA connects the three units and the controller to one another. A signal BRVA can be sent (in the case of a branch control instruction) by one of the units BDP or FPP, to indicate to the other units and to the controller DIR whether a conditional branch is effective or not. The signal BRVA is used by the receiving units and the controller to validate the instruction reading initialization signals CIIR, IIR sent by the addressing unit EAD. The three units are finally connected to one another by three end-of-instruction execution lines END1, END 2, END3. Via these lines, the units U1, U2, U3 can send the signals END1, END2, END3, signalling that they are ready to execute the last cycle of the instruction in progress, to the other two units. These signals will serve to synchronize the execution of instructions in each unit.

The control lines CD-OPE associated with the operand bus OPE include a line for notification of operand sending SEND, enabling the controller DIR to signal to the three units that it is sending an operand over the bus OPE. The three units of the controller DIR are also connected to one another via a reception acknowledgement line GOT, which enables each unit to send to DIR a signal acknowledging receipt in response to the sending signal SEND. The signal GOT is sent by the addressee unit for the operand. To assure the coherence of the transfers, the receiving unit cannot effectively send the signal GOT unless it is the owner of the bus OPE (specifically represented by the logic state of a multivibrator or flip-flop OPE-U1-OWN), i.e, has captured bus OPE.

An ownership transfer bus OPE-OWN connects the three units with one another, to allow the unit owning the operand bus to indicate the new owner of this bus. When a change of ownership must be effected (a situation provided in the microprogram of the owner unit, as a function of state parameters), the owner unit sends, over OPE-OWN, signals encoded as a function of the identity of the new owner unit. These signals are received by the other two units, and the receiving unit that is recognized as the new owner of the operand bus (by decoding of these signals) memorizes this situation (OPE-U1-OWN set to 1), which then authorizes the sending of the reception acknowledgement signals GOT and the ownership signals OPE-OWN. In summary, the signals CD-OPE employ an ownership mechanism for reception of the operands.

Unlike the operand bus, the result bus RES is managed by a sending ownership mechanism. The ownership of the result bus is specifically represented in each unit by the logic state of an ownership multivibrator RES-U1-OWN, the logic state of which either authorizes or prohibits the sending of a result to the unit.

The implementation of this mechanism uses the control line CD-RES defined as follows. An availability line GET of the cache memory connects the controller DIR to the three units and is used by it to send an availability signal signifying that at least one of its buffers OB1 or OB2 is empty. Analogously, links EMPTY connect the three units to one another, to enable the units that are not owners of the result bus (RES-U1-OWN=0) to inform the other units, and in particular the owner unit of the result bus, that they are ready to receive a result, or in other words that their results input buffer 8 (FIG. 3) is empty. A line of the RES-CA bus type for notification of the sending of a result connects the three units and the controller DIR to one another. The line RES-CA enables the result bus owner to send a result sending signal, to inform the controller DIR that a result intended for the cache memory has been sent. The three units are also connected to one another, via another bus-type line RES-CP for notification of sending a result from one unit to another unit. This line RES-CP is associated with an addressee bus DEST, which also connects the three units to one another. The bus DEST enables carrying an encoded signal making it impossible to identify the addressee of the result when the sending is signaled by RES-CP. The sending of signals over the lines RES-CA, RES-CP, DEST is conditioned by the state of the ownership multivibrator RES-U1-OWN. The state RES-U1-OWN also conditions the sending of change of ownership signals over an ownership transfer bus RES-OWN of the result bus. The bus RES-OWN connects the three units to one another and is used analogously to the bus OPE-OWN described above.

The algorithm channel ALGO is used for exchanges of information on transfer of control of the microprograms. This channel is useful because of the fact that transfer of control microinstructions are used in the microprograms of the units when the transfer of control conditions are determined by only one of these units. Hence the unit that determines the effective transfer of control must inform the other units, which can be achieved by means of this specific channel.

The mechanism of sending ownership is also used for the algorithm channel ALGO. The owner or captor of the channel ALGO (ALGO-U1-OWN=1) is authorized to send transfer of control signals of the microprogram, and the presence of this kind of sending is signaled by a transfer of control condition sending signal over the lines ALGO-SEND, connecting the units capable of using this information to one another. This sending is conditioned by a signal of availability of the addressee, sent over the lines ALGO-EMPTY. Naturally, only the non-owner or non-captor units (ALGO-U1-OWN=0) of the algorithm channel are authorized to send this availability signal. Finally, as was the case for the operand bus and the result bus, the ownership or capture of the algorithm channel can be changed by its owner (ALGO-U1-OWN=1), via ownership or capture transfer lines ALGO-OWN, which connect the units to one another. In the simplified case where only the units EAD and BDP have a need to exchange this information, ALGO-SEND, ALGO-OWN and ALGO-EMPTY are each constituted by a single line.

Because of the signals described above that the unit and the cache memory can exchange, each unit can autonomously manage the execution of the instructions received. Naturally, the microprograms loaded into the various units must be designed taking these mechanisms into account. Furthermore, synchronizing circuits capable of intervening in the execution of the microprogram as a function of the signals must be provided in the hard-wired portion 3 of the command block.

Figure 5:
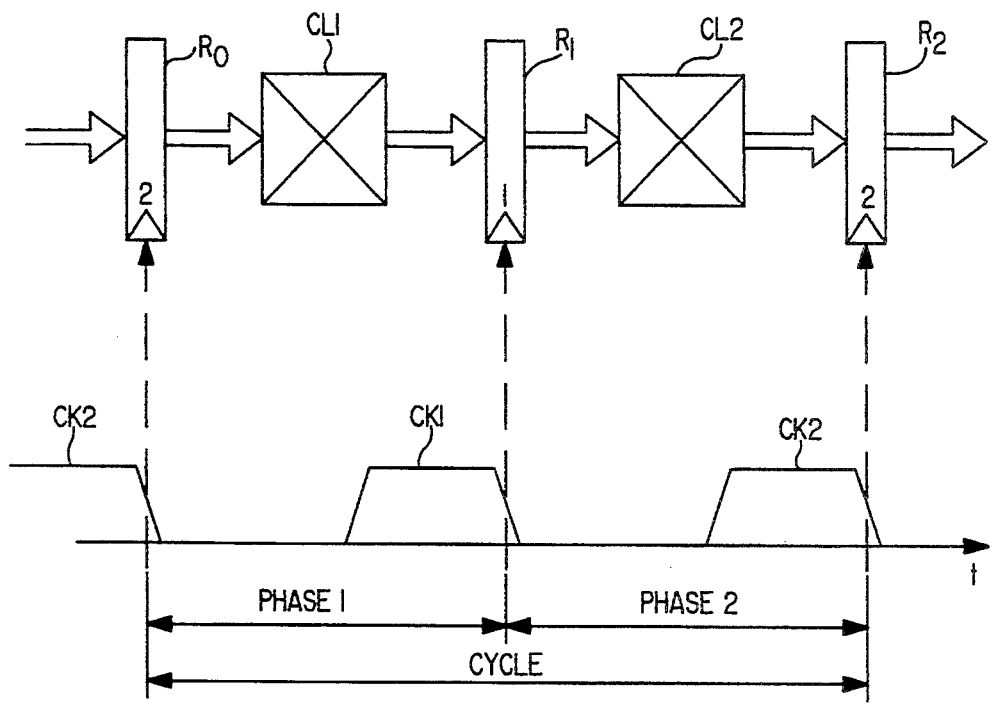
FIG. 5 illustrates the function of the circuits of the processing units, in two phases.
Figure 6:
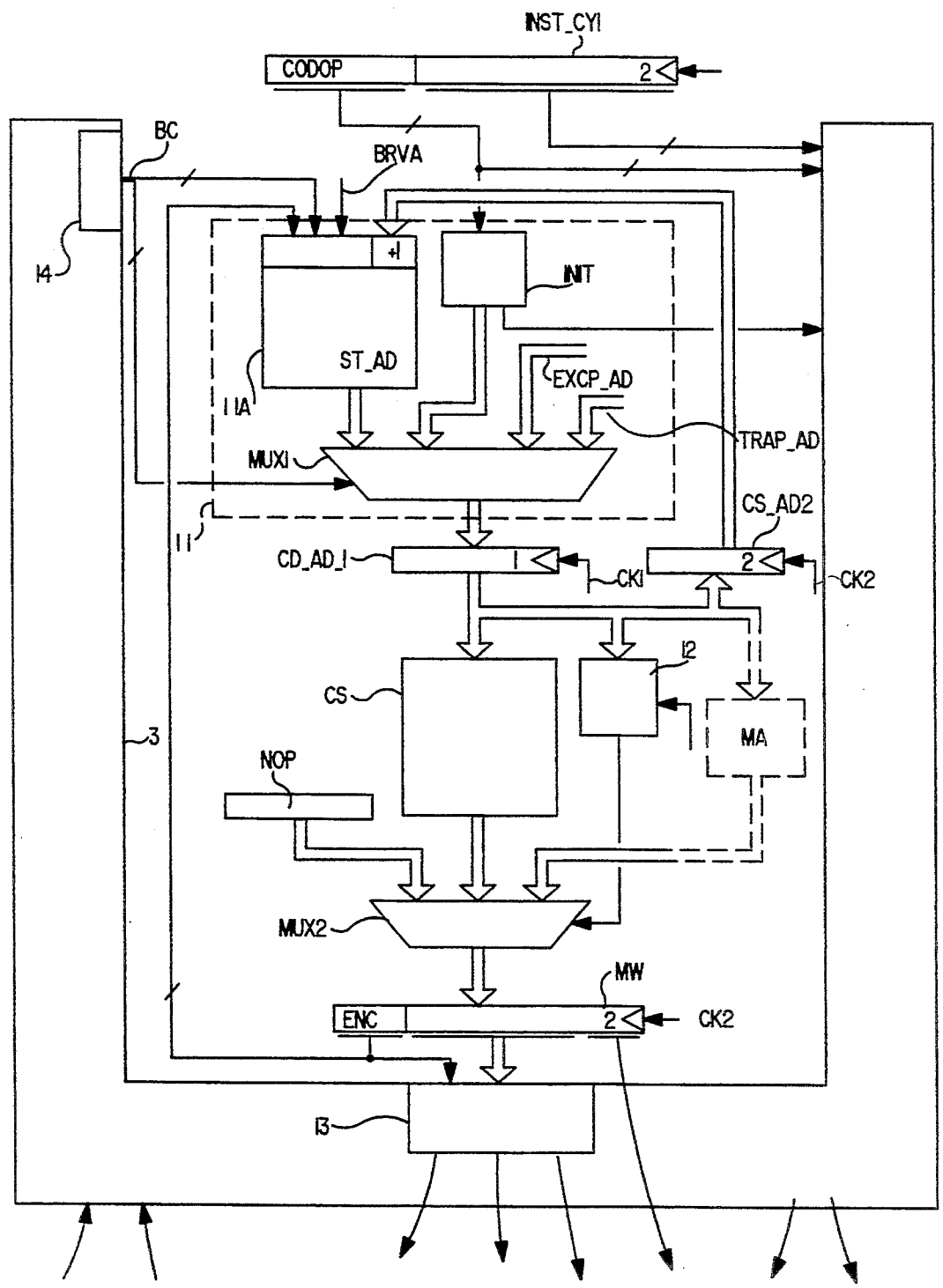
FIG. 6 shows the main elements of a command block of a processing unit for implementing the invention.

Before the synchronization circuits are described, the essential elements of the microprogrammed portions of the command block will be reviewed, referring to FIGS. 5 and 6.

FIG. 5 schematically illustrates the principle of sequencing the operations of the set of the processes, and in particular of the command block of each unit. This sequencing is achieved by means of clock signals CK1 and CK2 that define two successive phases PHASE 1 and PHASE 2; one cycle is defined as the succession of one phase 1 and one phase 2. As is apparent in FIG. 5, the circuits of one unit can be represented functionally as a cascade assembly of registers R0, R1, R2 and logic or combinatorial circuits of the CL1 or CL2 type, respectively evaluated in phase 1 or phase 2. The outputs of a logic circuit of the CL1 type are connected to the inputs of a downstream logic circuit of the CL2 type, by way of a register synchronized with the clock signal CK1 corresponding to the active phase 1. Similarly, the outputs of a circuit of the CL2 type are connected to the inputs of a downstream circuit (not shown) of the CL1 type, via a register R2 synchronized by CK2. Thus for the portion of the circuit shown by way of illustration, the circuit CL1 is active during phase 1 as a function of the input signals contained in the register R0 loaded during the preceding phase 2. The downstream circuit CL2 is active during the subsequent phase 2, as a function of the contents of the register R1 loaded during the preceding phase 1, and its result is loaded into the register R2 that is synchronized by the clock signal CK2.

The microprogrammed portion of FIG. 6 substantially comprises a microsequencer 11, outlined by dash lines, the output of which is connected to the input of the microinstruction address register CS-AD-1 synchronized by CK1. The output of this register is connected to the input of a microprogram memory CS. The register CS-AD-1 is also connected to the input of a register CS-AD-2 synchronized by CK2. This register serves to contain the address of the microinstruction being executed. The output of the memory CS is connected by way of a multiplexer MUX2 to the input of a register MW that is synchronized with CK2 and serves to contain the microprogram word (or microinstruction) normally furnished by the memory CS. The output of the register MW is connected to the hard-wired portion 3 of the command block and in particular to the decoder 13. The chaining field ENC of the register MW contains, in encoded form, the chaining microfunction associated with each microinstruction. The output lines of the register MW that correspond to the chaining field ENC are connected to the circuit 11A of the microsequencer 11 for calculation of the address of the next microinstruction. The circuit 11A is also connected at its input to the output of the register CS-AD-2. Finally, from the subassembly 14 of the hard-wired portion 3, the circuit 11A receives signals BC representing the microprogram branch conditions, in particular the signals arriving from the bus ALGO. These conditions are evaluated in phase 2 as a function of internal and external parameters. The circuit 11A also receives the transfer of control validation signal BRVA originating in another unit.

A current instruction register INST-CY1 synchronized by CK2 contains the instruction being executed. Its output is connected to the hard-wired portion 3 and to the input of an initializing circuit INIT, which is generally embodied as a read-only memory. As a function of the operating code CODOP of the instruction, the circuit INIT furnishes the address of the first microinstruction of the instruction execution microprogram.

A multiplexer MUX1 has a plurality of inputs comprising the output stage of the microsequencer 11. A first input is connected to the output of the circuit 11A, and a second input is connected to the output of the circuit INIT. The multiplexer MUX1 also receives at its input particular microprogram address signals, such as EXCP-AD or TRAP-ED, enabling detouring of the microprogram in the case of exceptions (EXCP) or specific events (TRAP). Under the command of transfer of control signals evaluated in phase 2 by the hard-wired portion 3, the multiplexer MUX1, in the course of the ensuing phase 1, selects the address of the microinstruction to be executed. This may be the first microinstruction of the instruction, a detour microinstruction, or the microinstruction defined by the circuit 11A upon normal running of the microprogram.

The output of the microinstruction address register CS-AS-1 can also be connected to an auxiliary external memory MA that serves to expand the capacity of the microprogram memory CS. In that case, the microprogram address is applied to a circuit 12 that enables detection whether the corresponding microinstruction is or is not contained in the internal memory CS. The output of the auxiliary memory MA is also applied to one of the inputs of the multiplexer MUX2. This multiplexer MUX2 is commanded by the circuit 12 in such a way as to select the output of the internal memory CS or the output of the auxiliary memory MA. The auxiliary memory MA may be a supplementary memory associated with the unit or optionally may be the central memory of the system, one zone of which is reserved for the microprograms.

Another input of the multiplexer MUX2 can receive a hard-wired microinstruction NOP, the execution of which does not change the logic state of the unit. The instruction NOP is activated when there is a need to keep the unit waiting, for example in the case where access to the auxiliary memory requires more cycles than does access to the internal memory.

The microinstruction contained in the register MW furnishes signals to the rest of the unit by way of a microinstruction decoder 13, in such a way as to drive all the resources of this unit and produce the signals exchanged with the outside. It is at the level of this decoding that the attribution and change of ownership signals that have been provided by microprogramming are especially produced.

In particular, in this way the first microinstruction for execution of an instruction determines each of the owner units of the buses OPE, RES and ALGO.

The command block of FIG. 6 is for the most part conventional in type, and so its function is well known to one skilled in the art. Hence there is no need to describe all the details of its function. However, it will be recalled that every new instruction loaded in phase 2 into the instruction register INST-CY1 is decoded by the initializing circuit INIT, which in the ensuing phase 1 furnishes the address of the first microinstruction. As a function of this address, the microprogram memory CS, in the ensuing phase 2, furnishes the first microinstruction from which the signals for commanding the resources of the unit are derived. During this same phase 2, the address of this microinstruction is loaded into the register CS-AD-2, to enable the unit 11A to calculate the address of the ensuing microinstruction as a function of the transfer of control signals BC processed during this phase.

From the standpoint of sequencing, it can be noted that the calculation of the address of a microinstruction is performed in phase 1 corresponding to a "reading" phase, while access to the microinstruction in the memory CS takes place in phase 2 corresponding to an "execution" phase. During this same "execution" phase, the register CS-AD-2 is loaded with the address contained in the register CS-AD-1, to prepare the microsequencer for calculating the address of the ensuing microinstruction. As a result, if the clock signal CK2 for executing phase 2 is inhibited, all the signals furnished to the microsequencer maintain their logic state unchanged, because the registers synchronized with CK2 have not been modified.

The above comment will now aid in explaining the means that can be used to achieve synchronization of the microprograms. For this purpose, FIG. 7 will now be described, which represents the circuit with which this synchronization is achieved.

Shown in this drawing figure is one of the registers Ri synchronized with CK2. This register is commanded by an AND gate 19 with three inputs. Two inputs comprise the clock signal CK2, and a microcommand signal mf generated by the decoder 13 as a function of the microinstruction MW. The third input of the AND gate 19 receives a signal NOEX* sent by a multivibrator flip-flop 20. This multivibrator 20 is loaded in phase 1 with a signal furnished by a set of logic circuits 15, 16, 17, 18.

Figure 4:
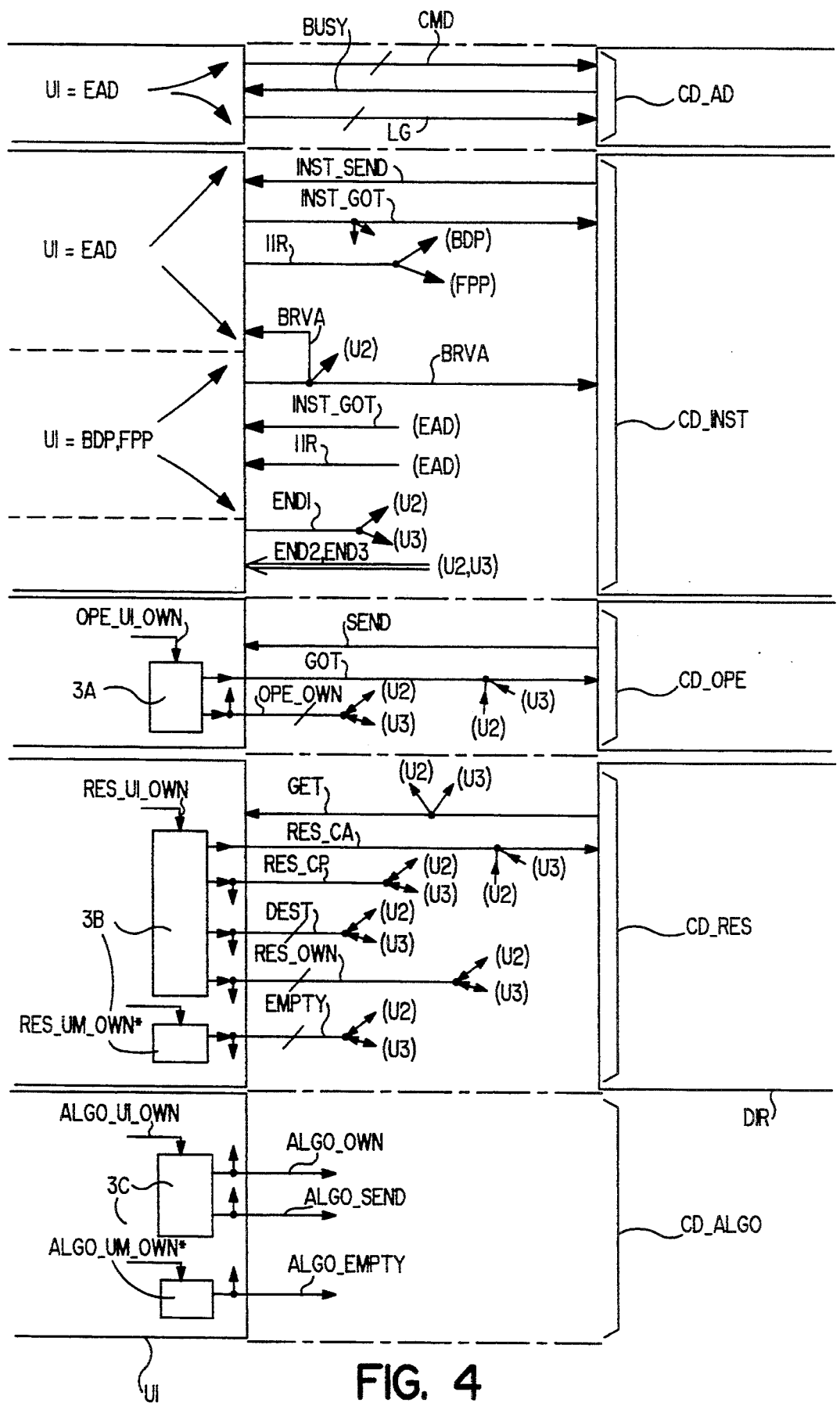
FIG. 4 shows the main signals exchanged among the processing units and with the cache memory.

The input signals of the circuits 16, 17, 18 that have already been introduced in the description of FIG. 4 will not be explained again here. However, it should be noted that they must be evaluated in phase 1 of a cycle.

The signals OPE-REC, RES-REC, RES-SEND obtained by decoding of the microinstruction being executed assumes the value of logical 1, when the unit is expecting an operand (OPE-REC), the unit is extending a result (RES-REC), and the unit seeks to send a result (RES-SEND), respectively.

The logic circuit 15 performs the NOR function and at its input receives a plurality of signals each of which defines a condition of nonexecution of the microinstruction in progress. In particular, it receives the output signals of the circuits 16, 17 and 18 that will now be described.

The signal NOEX-OPE furnished by the logic circuit 16 corresponds to the condition of nonexecution produced in the case where the unit expects an operand (OPE-REC=1) at a time when the cache memory is not signaling that it is sending an operand (SEND=0), or when the unit is not the owner of the operand bus (OPE-U1-OWN=0), which is summarized by the following logical equation:

NOEX-OPE=(OPE-REC)·[SEND*
+(OPE-U1-OWN)*], where the symbol * represents the complement of the logical variable (by the convention of positive logic).

A signal NOEX-RES-REC furnished by the logic circuit 17 corresponds to a nonexecution condition that is imposed in the case where the unit U1 expects a result (RES-REC=1) at a time when the sending of this result by another unit has not been signaled (RES-CP=0), or when the unit is not recognized as an addressee of the result sent (U1-DEST=0). The corresponding logical equation is:

NOEX-RES-REC=(RES-REC)·[(RES-CP)*
+(U1-DEST)*].

The signal NOEX-RES-SEND furnished by the logic circuit 18 corresponds to the following cases of nonexecution:

1) the unit U1 must send a result to the cache memory or to some other unit (RES-SEND-CA, or RES-SEND-U2, or RES-SEND-U3=1), at a time when the unit U1 is not the owner of the result bus (RES-U1-OWN=0);

2) the unit U1 must send a result to the cache memory (RES-SEND-CA=1), at a time when the cache memory is not ready to receive the result (GET=0);

3) the unit U must send a result to one of the other units U2 or U3 (RES-SEND-U2 or RES-SEND-U3=1) at a time when the addressee unit is not ready to receive the result (EMPTY-U2 or EMPTY-U3=0). These conditions are summarized by the following logical equation:

$$NOEX\text{-}RES\text{-}SEND = (RES\text{-}SEND\text{-}CA + RES\text{-}SEND\text{-}U2 + RES\text{-}SEND\text{-}U3)$$
$$(RES\text{-}U1\text{-}OWN)^* + (RES\text{-}SEND\text{-}CA) \cdot GET^* + (RES\text{-}SEND\text{-}U2) \cdot (EMPTY\text{-}U2)^* + (RES\text{-}SEND\text{-}U3) \cdot (EMPTY\text{-}U3)^*$$

The signal NOEX-ALGO corresponds analogously to the nonexecution conditions resulting from the impossibility on the part of the unit U1 to send a transfer of control datum that it should send or to receive an expected transfer of control datum. As a function of the signals defined in FIG. 4, the following equation applies:

$$NOEX\text{-}ALGO=(ALGO\text{-}SEND)\cdot[(ALGO\text{-}OWN)^* + ALGO\text{-}EMPTY] + (ALGO\text{-}REC) \cdot (ALGO\text{-}SEND)^*$$

where ALGO-REC is an internal signal for the unit that assumes the value of logical 1 when the unit U1 is expecting a transfer of control datum.

The circuit 15 can receive other nonexecution signals, such as NOEX-ST corresponding to the case where it is impossible to initiate the execution of the ensuing instruction or NOEX-ANT (which is specific to the addressing unit EAD) that prevents this unit from executing the ensuing instruction in the anticipated manner. Other nonexecution signals that may be provided will be apparent from the scope of the present invention and hence will not be described here.

The function of a unit when the synchronizing mechanism of the invention intervenes will now be described. For this purpose, reference is made to FIG. 6, assuming that phase 2 of an execution cycle has just ended. The logical state of the unit is then as follows: The active registers in phase 2, CS-AD-2 and MW, have just been loaded with new values, while the register CS-AD-1 retains the value that was loaded during the preceding phase 1. Aside from the case where a new instruction is to be executed (the START-INST microfunction), the register INST-CY1 keeps the same value.

Figure 7:
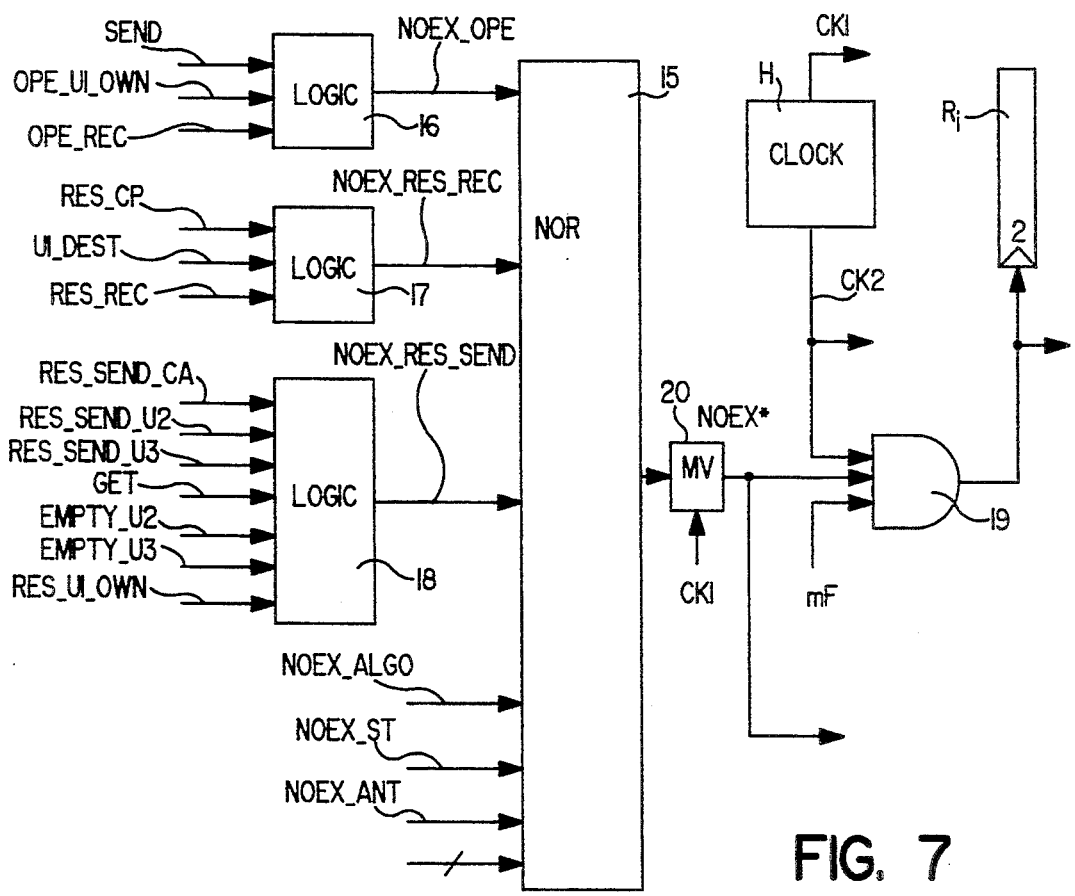
FIG. 7 shows the synchronization circuit of each processing unit.

At the onset of the ensuing phase 1, the microinstruction of register MW is decoded by the decoder 13, which at its output furnishes a set of microfunction signals enabling activation, during this phase or during the ensuing phase 2, of the operators and registers as a function of the microinstruction received. The signal mf applied in phase 2 to the input of the gate 19 of FIG. 7 shows one of these signals, by way of illustration. During this same phase 1, the unit receives interface signals from the other units and from the cache memory, in particular those signals that are to be taken into account by the circuit of FIG. 7 for synchronization.

Upon the appearance of the clock signal CK1, the registers synchronized with this signal can be loaded with their new value, to the extent that they are required in one of the microfunctions of the microinstruction. At the same instant, the multivibrator flip-flop 20 is loaded with the logical value present at the output of the circuit 15.

In the absence of a nonexecution condition (NO-EX*=1), the multivibrator flip-flop 20 then assumes the logical state 1, the consequence of which is to authorize the updating, if applicable, of the registers that are active in phase 2 upon the appearance of the next clock signal CK2. Otherwise, the multivibrator flip-flop 20 is at 0, and all the registers synchronized by CK2 are frozen.

This situation persists until such time as at least one of the nonexecution conditions is present. If the multivibrator is forced to the value of logical 1 in a later evaluation phase 1, thus signaling that all the execution conditions have been met, the set of registers synchronized with CK2 will be reauthorized to be modified during the ensuing phase 2. The execution phase 2 for the microinstruction that had been interrupted can thus be executed, and the new microinstruction is simultaneously loaded into the register MW.

It is understood that multiple variants of the embodiment described above are possible by using equivalent means, without departing from the scope of the present invention.

We claim:

1. A processor for a data processing system including a plurality of microprogrammed processing units ($U_1$, $U_2$, $U_3$), each of said processing units being particularly adapted to execute a complementary subset of functions of the processor, wherein the subset of functions of each processing unit complements the subset of functions of the remaining processing units to define a complete set of functions of the processor in a manner which enables pipeline execution of instructions by said processor, said units being connected to memory means (CA) containing program instructions to be executed and operands, at least one of said units being an addressing unit (EAD) for addressing said memory means (CA) to obtain the instructions and the operands, said processor being characterized in that said units ($U_1$, $U_2$, $U_3$) include command block means (1) for decoding the instructions furnished by the memory means (CA) and autonomously executing functions defined by said instructions, each unit further including synchronizing means (15, 16, 17, 18, 19) for authorizing or interrupting the execution of the microprogram defined by the instruction in progress in said unit, said synchronizing means being adapted to interrupt (NOEX) said execution when:

either an operand contained in said memory means (CA) and necessary for said execution is not effectively received by said unit, or a result expected by said unit and calculated by another unit is not effectively received by said unit, or a result calculated in said unit cannot be effectively transmitted to the unit or to the memorizing means intended to receive said result.

2. The processor of claim 1, wherein said memory means (CA) includes interface means (ICU) connected to a first operand bus (OPE), and a second result bus (RES), said first and second buses serving respectively to read the operands and write the results into said memory means (CA); each unit ($U_1$, $U_2$, $U_3$) being connected respectively via a first and second interface to said operand bus (OPE) and result bus (RES); each unit ($U_1$, $U_2$, $U_3$) further including first means (3) for receiving and detecting a first indicator of ownership (OPE- OWN) associated with the operand bus (OPE) and first sending means (3a) for sending to the other units said first indicator of ownership (OPE-OWN); each unit further including second means (3) for receiving and detecting a second indicator of ownership (RES-OWN) associated with the result bus (RES) and second sending means (3b) for sending to the other unit said second indicator of ownership (RES-OWN); and said units are connected to one another via first and second control links (CD-OPE, CD-RES) respectively enabling the sending of said first and second indicators; such that one of the conditions of effective reception of an operand by a unit is the detection by said unit of said first indicator (OPE-OWN); and one of the conditions of effective sending of a result by a unit is the detection in said unit of said second indicator (RES-OWN).

3. The processor of claim 2, wherein said memory means (CA) are connected to said units via operand sending notification links associated with the operand bus (OPE) and include means for transmitting operand sending signals (SEND) over these links when said memory means send an operand, and each unit further including means (3) for receiving and detecting said operand sending signals, and being characterized in that another condition of effective reception of an operand by a unit is the detection by said unit of an expected sending signal (SEND).

4. The processor of claim 3, wherein said units are connected to said memory means (CA) via reception acknowledgement links associated with the operand bus (OPE), and each unit including means (3) for sending over said reception acknowledgement links a signal of reception acknowledgement (GOT) when an operand is effectively received by said unit in such a way as to inform said memory means (CA) of receipt of the operand.

5. A processor for a data processing system including a plurality of microprogrammed processing units (U$_1$, U$_2$, U$_3$) sharing a set of functions of said processor, each unit being assigned the execution of a subset of functions of said processor, said units being connected to memory means (CA) containing program instructions to be executed and operands, at least one of said units being an addressing unit (EAD) for addressing said memory means (CA) to obtain the instructions and the operands, said processor being characterized in that said units (U1, U2, U3) include command block means (1) for decoding the instructions furnished by the memory means (CA) and autonomously executing functions defined by said instructions, each unit further including synchronizing means (15, 16, 17, 18, 19) for authorizing or interrupting the execution of the microprogram defined by the instruction in progress in said unit, said synchronizing means being adapted to interrupt (NOEX) said execution when:
either an operand contained in said memory means (CA) and necessary for said execution is not effectively received by said unit,
or a result expected by said unit and calculated by another unit is not effectively received by said unit,
or a result calculated in said unit cannot be effectively transmitted to the unit or to the memory means intended to receive said result,
wherein said memory means (CA) includes interface means (ICU) connected to a first operand bus (OPE), and a second result bus (RES), said first and second buses serving respectively to read the operands and write the results into said memory means (CA); each unit (U$_1$, U$_2$, U$_3$) being connected respectively via a first and second interface to said operand bus (OPE) and result bus (RES); each unit (U1, U2, U3) includes including first means (3) for receiving and detecting a first indicator of ownership (OPE-OWN) associated with the operand bus (OPE) and first sending means (3a) for sending to the other units said first indicator of ownership (OPE-OWN); each unit further including second means (3) for receiving and detecting a second indicator of ownership (RES-OWN) associated with the result bus (RES) and second sending means (3b) for sending to the other unit said second indicator of ownership (RES-OWN); and said units are connected to one another via first and second control links (CD-OPE, CD-RES) respectively enabling the sending of said first and second indicators; such that one of the conditions of effective reception of an operand by a unit is the detection by said unit of said first indicator (OPE-OWN); and one of the conditions of effective sending of a result by a unit is the detection in said unit of said second indicator (RES-OWN),
wherein said memory means (CA) and said units (U$_1$, U$_2$, U$_3$) are connected to one another by availability links associated with the result bus (RES) and said units each including means for exchanging over these links availability signals (GET, EMPTY), such that another condition of effective sending of a result by a unit is the detection by said unit of an availability signal (GET, EMPTY) sent by the addressee of the results.

6. A processor for a data processing system including a plurality of microprogrammed processing units (U$_1$, U$_2$, U$_3$) sharing a set of functions of said processor, each unit being assigned the execution of a subset of functions of said processor, said units being connected to memory means (CA) containing program instructions to be executed and operands, at least one of said units being an addressing unit (EAD) for addressing said memory means (CA) to obtain the instructions and the operands, said processor being characterized in that said units (U$_1$, U$_2$, U$_3$) include command block means (1) for decoding the instructions furnished by the memory means (CA) and autonomously executing functions defined by said instructions, each unit further including synchronizing means (15, 16, 17, 18, 19) for authorizing or interrupting the execution of the microprogram defined by the instruction in progress in said unit, said synchronizing means being adapted to interrupt (NOEX) said execution when:
either an operand contained in said memory means (CA) and necessary for said execution is not effectively received by said unit,
or a result expected by said unit and calculated by another unit is not effectively received by said unit,
or a result calculated in said unit cannot be effectively transmitted to the unit or to the memory means intended to receive said result;
wherein said memory means (CA) includes interface means (ICU) connected to a first operand bus (OPE), and a second result bus (RES), said first and second buses serving respectively to read the operands and write the results into said memory means (CA); each unit (U$_1$, U$_2$, U$_3$) being connected respectively via a first and second interface to said operand bus (OPE) and result bus (RES); each unit (U1, U2, U3) includes including first means (3) for receiving and detecting a first indicator of ownership (OPE-OWN) associated with the operand bus (OPE) and first sending means (3a) for sending to the other units said first indicator of ownership (OPE-OWN); each unit further including second means (3) for receiving and detecting a second indicator of ownership (RES-OWN) associated with the result bus (RES) and second sending means (3b) for sending to the other unit said second indicator of ownership (RES-OWN); and said units are connected to one another via first and second control links (CD-OPE, CD-RES) respectively enabling the sending of said first and second indicators; such that one of the conditions of effective reception of an operand by a unit is the detection by said unit of said first indicator (OPE-OWN); and one of the conditions of effective sending of a result by a unit is the detection in said unit of said second indicator (RES-OWN);

wherein said memory means (CA) are connected to said units via operand sending notification links associated with the operand bus (OPE) and include means for transmitting operand sending signals (SEND) over these links when said memory means send an operand, and each unit further including means (3) for receiving and detecting said operand sending signals, and being characterized in that another condition of effective reception of an operand by a unit is the detection by said unit of an expected sending signal (SEND), wherein said memory means (CA) and said units ($U_1$, $U_2$, $U_3$) are connected to one another by availability links associated with the result bus (RES), said units each including means for exchanging over these links availability signals (GET, EMPTY) such that another condition of effective sending of a result by a unit is the detection by said unit of an availability signal (GET, EMPTY) sent by the addressee of the result;

wherein said memory means (CA) and said units ($U_1$, $U_2$, $U_3$) are connected to one another by availability links associated with the result bus (RES), said units each including means for exchanging over these links availability signals (GET, EMPTY), such that another condition of effective sending of a result by a unit is the detection by said unit of an availability signal (GET, EMPTY) sent by the addressee of the result.

7. A processor for a data processing system including a plurality of microprogrammed processing units ($U_1$, $U_2$, $U_3$) sharing a set of functions of said processor, each unit being assigned the execution of a subset of functions of said processor, said units being connected to memory means (CA) containing program instructions to be executed and operands, at least one of said units being an addressing unit (EAD) for addressing said memory means (CA) to obtain the instructions and the operands, said processor being characterized in that said units (U1, U2, U3) include command block means (1) for decoding the instructions furnished by the memory means (CA) and autonomously executing functions defined by said instructions, each unit further including synchronizing means (15, 16, 17, 18, 19) for authorizing or interrupting the execution of the microprogram defined by the instruction in progress in said unit, said synchronizing means being adapted to interrupt (NOEX) said execution when:

either an operand contained in said memory means (CA) and necessary for said execution is not effectively received by said unit, or a result expected by said unit and calculated by another unit is not effectively received by said unit, or a result calculated in said unit cannot be effectively transmitted to the unit or to the memory means intended to receive said result;

wherein said memory means (CA) includes interface means (ICU) connected to a first operand bus (OPE), and a second result bus (RES), said first and second buses serving respectively to read the operands and write the results into said memory means (CA); each unit ($U_1$, $U_2$, $U_3$) being connected respectively via a first and second interface to said operand bus (OPE) and result bus (RES); each unit (U1, U2, U3) includes including first means (3) for receiving and detecting a first indicator of ownership (OPE-OWN) associated with the operand bus (OPE) and first sending means (3a) for sending to the other units said first indicator of ownership (OPE-OWN); each unit further including second means (3) for receiving and detecting a second indicator of ownership (RES-OWN) associated with the result bus (RES) and second sending means (3b) for sending to the other unit said second indicator of ownership (RES-OWN); and said units are connected to one another via first and second control links (CD-OPE, CD-RES) respectively enabling the sending of said first and second indicators; such that one of the conditions of effective reception of an operand by a unit is the detection by said unit of said first indicator (OPE-OWN); and one of the conditions of effective sending of a result by a unit is the detection in said unit of said second indicator (RES-OWN);

wherein said memory means (CA) are connected to said units via operand sending notification links associated with the operand bus (OPE) and include means for transmitting operand sending signals (SEND) over these links when said memory means send an operand, and each unit further including means (3) for receiving and detecting said operand sending signals, and being characterized in that another condition of effective reception of an operand by a unit is the detection by said unit of an expected sending signal (SEND);

wherein said units are connected to said memory means (CA) via reception acknowledgement links associated with the operand bus (OPE), and each unit including means (3) for sending over said reception acknowledgement links a signal of reception acknowledgement (GOT) when an operand is effectively received by said unit in such a way as to inform said memory means (CA) of the receipt of the operand;

wherein said memory means (CA) and said units ($U_1$, $U_2$, $U_3$) are connected to one another by availability links associated with the result bus (RES), said units each including means for exchanging over these links availability signals (GET, EMPTY), such that another condition of effective sending of a result by a unit is the detection by said unit of an availability signal (GET, EMPTY) sent by the addressee of the result.

8. The processor of claim 2, wherein said units are connected to one another by links associated with the result bus (RES) for notifying that a result has been sent, said units including owner unit means for exchanging result sending signals (RES-CP) and addressee signals (DEST) over said links, said result sending signals (RES-CP) and said addressee signals (DEST) being sent by the owner unit means when said owner unit means sends data over the result bus (RES) to the unit identified by said addressee signals (DEST); and being characterized in that the condition of effective reception of a result by a unit is the detection of a result sending signal (RES-CP) and the coincidence of said addressee signals with the identity of said unit.

9. A processor for a data processing system including a plurality of microprogrammed processing units ($U_1$, $U_2$, $U_3$) sharing a set of functions of said processor, each unit being assigned the execution of a subset of functions of said processor, said units being connected to memory means (CA) containing program instructions to be executed and operands, at least one of said units being an addressing unit (EAD) for addressing said memory means (CA) to obtain the instructions and the operands, said processor being characterized in that said units (U1, U2, U3) include command block means (1) for decoding the instructions furnished by the memory means (CA) and autonomously executing functions defined by said instructions, each unit further including synchronizing means (15, 16, 17, 18, 19) for authorizing or interrupting the execution of the microprogram defined by the instruction in progress in said unit, said synchronizing means being adapted to interrupt (NOEX) said execution when:

either an operand contained in said memory means (CA) and necessary for said execution is not effectively received by said unit, or a result expected by said unit and calculated by another unit is not effectively received by said unit, or a result calculated in said unit cannot be effectively transmitted to the unit or to the memory means intended to receive said result;

wherein said memory means (CA) includes interface means (ICU) connected to a first operand bus (OPE), and a second result bus (RES), said first and second buses serving respectively to read the operands and write the results into said memory means (CA); each unit ($U_1$, $U_2$, $U_3$) being connected respectively via a first and second interface to said operand bus (OPE) and result bus (RES); each unit (U1, U2, U3) includes including first means (3) for receiving and detecting a first indicator of ownership (OPE-OWN) associated with the operand bus (OPE) and first sending means (3a) for sending to the other units said first indicator of ownership (OPE-OWN); each unit further including second means (3) for receiving and detecting a second indicator of ownership (RES-OWN) associated with the result bus (RES) and second sending means (3b) for sending to the other unit said second indicator of ownership (RES-OWN); and said units are connected to one another via first and second control links (CD-OPE, CD-RES) respectively enabling the sending of said first and second indicators; such that one of the conditions of effective reception of an operand by a unit is the detection by said unit of said first indicator (OPE-OWN); and one of the conditions of effective sending of a result by a unit is the detection in said unit of said second indicator (RES-OWN);

wherein said memory means (CA) are connected to said units via operand sending notification links associated with the operand bus (OPE) and include means for transmitting operand sending signals (SEND) over these links when said memory means send an operand, and each unit further including means (3) for receiving and detecting said operand sending signals, and being characterized in that another condition of effective reception of an operand by a unit is the detection by said unit of an expected sending signal (SEND);

wherein said units are connected to one another by links associated with the result bus (RES) notifying that a result has been sent for said units including owner unit means for exchanging result sending signals (RES-CP) and addressee signals (DEST) over said links, said result sending signals (RES-CP) and said addressee signals (DEST) being sent by the owner unit means when said owner unit means sends data over the result bus (RES) to the unit identified by said addressee signals (DEST); and being characterized in that the condition of effective reception of a result by a unit is the detection of a result sending signal (RES-CP) and the coincidence of said addressee signals with the identify of said unit.

10. The processor of claim 4, wherein said units are connected to one another by links associated with the result bus (RES) notifying that a result has been sent for said units including owner unit means for exchanging result sending signals (RES-CP) and addressee signals (DEST) over said links, said result sending signals (RES-CP) and said addressee signals (DEST) being sent by the owner unit means when said owner unit means sends data over the result bus (RES) to the unit identified by said addressee signals (DEST); and being characterized in that the condition of effective reception of a result by a unit is the detection of a result sending signal (RES-CP) and the coincidence of said addressee signals with the identity of said unit.

11. The processor of claim 5, wherein said units are connected to one another by links associated with the result bus (RES) notifying that a result has been sent for said units including owner unit means for exchanging result sending signals (RES-CP) and addressee signals (DEST) over said links, said result sending signals (RES-CP) and said addressee signals (DEST) being sent by the owner unit means when said owner unit means sends data over the result bus (RES) to the unit identified by said addressee signals (DEST); and being characterized in that the condition of effective reception of a result by a unit is the detection of a result sending signal (RES-CP) and the coincidence of said addressee signals with the identity of said unit.

12. The processor of claim 2, wherein each unit includes a command block and the respective ownerships (OPE-OWN, RES-OWN) of the operand bus (OPE) and result bus (RES) at the beginning of execution of the microprogram of the instruction in progress are determined by the command block of each unit as a function of the operating code of said instructions; and said ownerships being capable of modification during the execution of said microprogram by the owner unit means of said operand and result buses (OPE, RES).

13. The processor of claim 3, wherein each unit includes a command block and the respective ownerships (OPE-OWN, RES-OWN) of the operand bus (OPE) and result bus (RES) at the beginning of execution of the microprogram of the instruction in progress are determined by the command block of each unit as a function of the operating code of said instructions; and said ownerships being capable of modification during the execution of said microprogram by the owner unit means of said operand and result buses (OPE, RES).

14. The processor of claim 4, wherein each unit includes a command block and the respective ownerships (OPE-OWN, RES-OWN) of the operand bus (OPE) and result bus (RES) at the beginning of execution of the microprogram of the instruction in progress are determined by the command block of each unit as a function of the operating code of said instructions; and said ownerships being capable of modification during the execution of said microprogram by the owner unit means of said operand and result buses (OPE, RES).

15. The processor of claim 5, wherein each unit includes a command block and the respective ownerships (OPE-OWN, RES-OWN) of the operand bus (OPE) and result bus (RES) at the beginning of execution of the microprogram of the instruction in progress are determined by the command block of each unit as a function of the operating code of said instructions; and said ownerships being capable of modification during the execution of said microprogram by the owner unit means of said operand and result buses (OPE, RES).

16. The processor of claim 6, wherein each unit includes a command block and the respective ownerships (OPE-OWN, RES-OWN) of the operand bus (OPE) and result bus (RES) at the beginning of execution of the microprogram of the instruction in progress are determined by the command block of each unit as a function of the operating code of said instructions; and said ownerships being capable of modification during the execution of said microprogram by the owner unit means of said operand and result buses (OPE, RES).

17. The processor of claim 7, wherein each unit includes a command block and the respective ownerships (OPE-OWN, RES-OWN) of the operand bus (OPE) and result bus (RES) at the beginning of execution of the microprogram of the instruction in progress are determined by the command block of each unit as a function of the operating code of said instructions; and said ownerships being capable of modification during the execution of said microprogram by the owner unit means of said operand and result buses (OPE, RES).

18. A processor for a data processing system including a plurality of microprogrammed processing units ($U_1$, $U_2$, $U_3$) sharing a set of functions of said processor, each unit being assigned the execution of a subset of functions of said processor, said units being connected to memory means (CA) containing program instructions to be executed and operands, at least one of said units being an addressing unit (EAD) for addressing said memory means (CA) to obtain the instructions and the operands, said processor being characterized in that said units (U1, U2, U3) include command block means (1) for decoding the instructions furnished by the memory means (CA) and autonomously executing functions defined by said instructions, each unit further including synchronizing means (15, 16, 17, 18, 19) for authorizing or interrupting the execution of the microprogram defined by the instruction in progress in said unit, said synchronizing means being adapted to interrupt (NOEX) said execution when:
  either an operand contained in said memory means (CA) and necessary for said execution is not effectively received by said unit,
  or a result expected by said unit and calculated by another unit is not effectively received by said unit,
  or a result calculated in said unit cannot be effectively transmitted to the unit or to the memory means intended to receive said result;
wherein said memory means (CA) includes interface means (ICU) connected to a first operand bus (OPE), and a second result bus (RES), said first and second buses serving respectively to read the operands and write the results into said memory means (CA); each unit ($U_1$, $U_2$, $U_3$) being connected respectively via a first and second interface to said operand bus (OPE) and result bus (RES); each unit (U1, U2, U3) includes including first means (3) for receiving and detecting a first indicator of ownership (OPE-OWN) associated with the operand bus (OPE) and first sending means (3a) for sending to the other units said first indicator of ownership (OPE-OWN); each unit further including second means (3) for receiving and detecting a second indicator of ownership (RES-OWN) associated with the result bus (RES) and second sending means (3b) for sending to the other unit said second indicator of ownership (RES-OWN); and said units are connected to one another via first and second control links (CD-OPE, CD-RES) respectively enabling the sending of said first and second indicators; such that one of the conditions of effective reception of an operand by a unit is the detection by said unit of said first indicator (OPE-OWN); and one of the conditions of effective sending of a result by a unit is the detection in said unit of said second indicator (RES-OWN);
wherein said units are connected to one another by links associated with the result bus (RES) for notifying that a result has been sent, said units including owner unit means for exchanging result sending signals (RES-CP) and addressee signals (DEST) over said links, said result sending signals (RES-CP) and said addressee signals (DEST) being sent by the owner unit means when said owner unit means sends data over the result bus (RES) to the unit identified by said addressee signals (DEST); and being characterized in that the condition of effective reception of a result by a unit is the detection of a result sending signal (RES-CP) and the coincidence of said addressee signals with the identity of said unit, and
wherein each unit includes a command block and the respective ownerships (OPE-OWN, RES-OWN) of the operand bus (OPE) and result bus (RES) at the beginning of execution of the microprogram of the instruction in progress are determined by the command block of each unit as a function of the operating code of said instructions; and said ownerships being capable of modification during the execution of said microprogram by the owner unit means of said operand and result buses (OPE, RES).

19. The processor of claim 2, wherein each unit includes means (15, 19) for suspending execution of the microprogram in progress in each unit upon the detection of a conditional transfer of control microinstruction, the calculation of which is not performed by said unit, said units being connected to one another by an algorithm link (ALGO) enabling the unit that calculates the conditional transfer of control the transmit the results of said calculation to the other units, thus authorizing the continuation of the suspended microprograms in said other units.

20. The processor of claim 3, wherein each unit includes means (15, 19) for suspending execution of the microprogram in progress in each unit upon the detection of a conditional transfer of control microinstruction, the calculation of which is not performed by said unit, said units being connected to one another by an algorithm link (ALGO) enabling the unit that calculates the conditional transfer of control the transmit the results of said calculation to the other units, thus authorizing the continuation of the suspended microprograms in said other units.

21. The processor of claim 4, wherein each unit includes means (15, 19) for suspending execution of the microprogram in progress in each unit upon the detection of a conditional transfer of control microinstruction, the calculation of which is not performed by said unit, said units being connected to one another by an algorithm link (ALGO) enabling the unit that calculates the conditional transfer of control the transmit the results of said calculation to the other units, thus authorizing the continuation of the suspended microprograms in said other units.

22. The processor of claims 5, wherein each unit includes means (15, 19) for suspending execution of the microprogram in progress in each unit upon the detection of a conditional transfer of control microinstruction, the calculation of which is not performed by said unit, said units being connected to one another by an algorithm link (ALGO) enabling the unit that calculates the conditional transfer of control the transmit the results of said calculation to the other units, thus authorizing the continuation of the suspended microprograms in said other units.

23. The processor of claim 8, wherein each unit includes means (15, 19) for suspending execution of the microprogram in progress in each unit upon the detection of a conditional transfer of control microinstruction, the calculation of which is not performed by said unit, said units being connected to one another by an algorithm link (ALGO) enabling the unit that calculates the conditional transfer of control the transmit the results of said calculation to the other units, thus authorizing the continuation of the suspended microprograms in said other units.

24. The processor of claim 12, wherein each unit includes means (15, 19) for suspending execution of the microprogram in progress in each unit upon the detection of a conditional transfer of control microinstruction, the calculation of which is not performed by said unit, said units being connected to one another by an algorithm link (ALGO) enabling the unit that calculates the conditional transfer of control the transmit the results of said calculation to the other units, thus authorizing the continuation of the suspended microprograms in said other units.

25. The processor of claim 2, wherein said memory means (CA) comprise a cache memory, and said interface means (ICU) of said cache memory includes at least two independent buffers (OB1, OB2) connected at the input to the result bus (RES) and to the cache memory, and connected at the output to the operand bus (OPE) and to the cache memory.

26. The processor of claim 3, wherein said memory means (CA) comprise a cache memory, and said interface means (ICU) of said cache memory includes at least two independent buffers (OB1, OB2) connected at the input to the result bus (RES) and to the cache memory, and connected at the output to the operand bus (OPE) and to the cache memory.

27. The processor of claim 4, wherein said memory means (CA) comprise a cache memory, and said interface means (ICU) of said cache memory includes at least two independent buffers (OB1, OB2) connected at the input to the result bus (RES) and to the cache memory, and connected at the output to the operand bus (OPE) and to the cache memory.

28. The processor of claim 5, wherein said memory means (CA) comprise a cache memory, and said interface means (ICU) of said cache memory includes at least two independent buffers (OB1, OB2) connected at the input to the result bus (RES) and to the cache memory, and connected at the output to the operand bus (OPE) and to the cache memory.

29. The processor of claim 8, wherein said memory means (CA) comprise a cache memory, and said interface means (ICU) of said cache memory includes at least two independent buffers (OB1, OB2) connected at the input to the result bus (RES) and to the cache memory, and connected at the output to the operand bus (OPE) and to the cache memory.

30. The processor of claim 12, wherein said memory means (CA) comprise a cache memory, and said interface means (ICU) of said cache memory includes at least two independent buffers (OB1, OB2) connected at the input to the result bus (RES) and to the cache memory, and connected at the output to the operand bus (OPE) and to the cache memory.

31. A processor for a data processing system including a plurality of microprogrammed processing units ($U_1$, $U_2$, $U_3$) sharing a set of functions of said processor, each unit being assigned the execution of a subset of functions of said processor, said units being connected to memory means (CA) containing program instructions to be executed and operands, at least one of said units being an addressing unit (EAD) for addressing said memory means (CA) to obtain the instructions and the operands, said processor being characterized in that said units (U1, U2, U3) include command block means (1) for decoding the instructions furnished by the memory means (CA) and autonomously executing functions defined by said instructions, each unit further including synchronizing means (15, 16, 17, 18, 19) for authorizing or interrupting the execution of the microprogram defined by the instruction in progress in said unit, said synchronizing means being adapted to interrupt (NOEX) said execution when:
 either an operand contained in said memory means (CA) and necessary for said execution is not effectively received by said unit,
 or a result expected by said unit and calculated by another unit is not effectively received by said unit,
 or a result calculated in said unit cannot be effectively transmitted to the unit or to the memory means intended to receive said result;
 wherein said memory means (CA) includes interface means (ICU) connected to a first operand bus (OPE), and a second result bus (RES), said first and second buses serving respectively to read the operands and write the results into said memory means (CA); each unit ($U_1$, $U_2$, $U_3$) being connected respectively via a first and second interface to said operand bus (OPE) and result bus (RES); each unit (U1, U2, U3) includes including first means (3) for receiving and detecting a first indicator of ownership (OPE-OWN) associated with the operand bus (OPE) and first sending means (3a) for sending to the other units said first indicator of ownership (OPE-OWN); each unit further including second means (3) for receiving and detecting a second indicator of ownership (RES-OWN) associated with the result bus (RES) and second sending means (3b) for sending to the other unit said second indicator of ownership (RES-OWN); and said units are connected to one another via first and second control links (CD-OPE, CD-RES) respectively enabling the sending of said first and second indicators; such that one of the conditions of effective reception of an operand by a unit is the detection by said unit of said first indicator (OPE-OWN); and one of the conditions of effective sending of a result by a unit is the detection in said unit of said second indicator (RES-OWN);

wherein each unit includes means (15, 19) for suspending execution of the microprogram in progress in each unit upon the detection of a conditional transfer of control microinstruction, the calculation of which is not performed by said unit, said units being connected to one another by an algorithm link (ALGO) enabling the unit that calculates the conditional transfer of control to transmit the results of said calculation to the other units, thus authorizing the continuation of the suspended microprograms in said other units; and wherein said memory means (CA) comprise a cache memory, and said interface means (ICU) of said cache memory includes at least two independent buffers (OB1, OB2) connected at the input to the result bus (RES) and to the cache memory, and connected at the output to the operand bus (OPE) and to the cache memory.

32. The processor of claim 1, wherein said processing units, in addition to the addressing unit (EAD), include binary and a decimal calculation unit (BDP) and a floating point calculation unit (FPP).

33. The processor of claim 2, wherein said processing units, in addition to the addressing unit (EAD), include binary and a decimal calculation unit (BDP) and a floating point calculation unit (FPP).

34. The processor of claim 3, wherein said processing units, in addition to the addressing unit (EAD), include binary and a decimal calculation unit (BDP) and a floating point calculation unit (FPP).

35. The processor of claim 4, wherein said processing units, in addition to the addressing unit (EAD), include binary and a decimal calculation unit (BDP) and a floating point calculation unit (FPP).

36. The processor of claim 5, wherein said processing units, in addition to the addressing unit (EAD), include binary and a decimal calculation unit (BDP) and a floating point calculation unit (FPP).

37. The processor of claim 8, wherein said processing units, in addition to the addressing unit (EAD), include binary and a decimal calculation unit (BDP) and a floating point calculation unit (FPP).

38. The processor of claim 12, wherein said processing units, in addition to the addressing unit (EAD), include binary and a decimal calculation unit (BDP) and a floating point calculation unit (FPP).

39. The processor of claim 19, wherein said processing units, in addition to the addressing unit (EAD), include binary and a decimal calculation unit (BDP) and a floating point calculation unit (FPP).

40. A processor for a data processing system including a plurality of microprogrammed processing units ($U_1$, $U_2$, $U_3$) sharing a set of functions of said processor, each unit being assigned the execution of a subset of functions of said processor, said units being connected to memory means (CA) containing program instructions to be executed and operands, at least one of said units being an addressing unit (EAD) for addressing said memory means (CA) to obtain the instructions and the operands, said processor being characterized in that said units (U1, U2, U3) include command block means (1) for decoding the instructions furnished by the memory means (CA) and autonomously executing functions defined by said instructions, each unit further including synchronizing means (15, 16, 17, 18, 19) for authorizing or interrupting the execution of the microprogram defined by the instruction in progress in said unit, said synchronizing means being adapted to interrupt (NOEX) said execution when:

either an operand contained in said memory means (CA) and necessary for said execution is not effectively received by said unit, or a result expected by said unit and calculated by another unit is not effectively received by said unit, or a result calculated in said unit cannot be effectively transmitted to the unit or to the memory means intended to receive said result;

wherein said memory means (CA) includes interface means (ICU) connected to a first operand bus (OPE), and a second result bus (RES), said first and second buses serving respectively to read the operands and write the results into said memory means (CA); each unit ($U_1$, $U_2$, $U_3$) being connected respectively via a first and second interface to said operand bus (OPE) and result bus (RES); each unit (U1, U2, U3) includes including first means (3) for receiving and detecting a first indicator of ownership (OPE-OWN) associated with the operand bus (OPE) and first sending means (3a) for sending to the other units said first indicator of ownership (OPE-OWN); each unit further including second means (3) for receiving and detecting a second indicator of ownership (RES-OWN) associated with the result bus (RES) and second sending means (3b) for sending to the other unit said second indicator of ownership (RES-OWN); and said units are connected to one another via first and second control links (CD-OPE, CD-RES) respectively enabling the sending of said first and second indicators; such that one of the conditions of effective reception of an operand by a unit is the detection by said unit of said first indicator (OPE-OWN); and one of the conditions of effective sending of a result by a unit is the detection in said unit of said second indicator (RES-OWN);

wherein said memory means (CA) comprise a cache memory, and said interface means (ICU) of said cache memory includes at least two independent buffers (OB1, OB2) connected at the input to the result bus (RES) and to the cache memory, and connected at the output to the operand bus (OPE) and to the cache memory; and wherein said processing units, in addition to the addressing unit (EAD), include binary and a decimal calculation unit (BDP) and a floating point calculation unit (FPP).

* * * * *

UNITED STATES PATENT AND TRADEMARK OFFICE
CERTIFICATE OF CORRECTION

PATENT NO. : 5,408,623
DATED : April 18, 1995
INVENTOR(S) : Thierry DOLIDON et al It is certified that error appears in the above-indentified patent and that said Letters Patent is hereby corrected as shown below:

Col. 18, line 43 (Claim 6, line 11) "$(U_1,U_2,U_3)$" should be --(U1,U2,U3)--.

Col. 22, lines 23 and 24 (Claim 9, lines 80 and 81) "identify" should be --identity--.

Cols. 24 and 25:
Claims 19, 20, 21, 22, 23 and 24, (line 8 of each claim) "control the transmit" should be --control to transmit--.

Signed and Sealed this

Fifth Day of December, 1995

Attest:

BRUCE LEHMAN

Attesting Officer

Commissioner of Patents and Trademarks